United States Patent [19]

Atsukawa et al.

[11] 3,903,243

[45] Sept. 2, 1975

[54] METHOD FOR IMPURITY REMOVAL IN A WET LIME-GYPSUM PROCESS EXHAUST DESULFURIZATION EQUIPMENT

[75] Inventors: Masumi Atsukawa; Hiroyuki Ushio; Masaaki Yanagi, all of Hiroshima, Japan

[73] Assignee: Mitsubishi Jukogyo Kabushiki Kaisha, Tokyo, Japan

[22] Filed: Nov. 22, 1972

[21] Appl. No.: 308,668

[52] U.S. Cl. .............. 423/242; 423/166; 423/555
[51] Int. Cl.² ........................................ C01B 17/00
[58] Field of Search .................. 423/242–244, 423/166, 555

[56] References Cited
UNITED STATES PATENTS

| | | | |
|---|---|---|---|
| 2,080,779 | 5/1937 | Lessing | 423/242 |
| 2,090,142 | 8/1937 | Nonhebel et al. | 423/242 |
| 2,155,853 | 4/1939 | Anthony | 423/242 |

*Primary Examiner*—Herbert T. Carter
*Assistant Examiner*—Gregory A. Heller
*Attorney, Agent, or Firm*—Toren, McGeady and Stanger

[57] ABSTRACT

A method for impurity removal in a wet lime-gypsum process exhaust desulfurization equipment wherein sulfur oxide is removed, with the aid of a lime slurry solution as absorbent, from sulfur oxide-containing gas cooled and dedusted in a cooling tower, which comprises the steps of supplying the solution obtained by filtering out by-product gypsum from the resulting gypsum slurry to the cooling tower as the cooling and dedusting medium, thereby collecting the dust from the gas, extracting a part of the cooling medium and a part of the lime slurry solution and mixing them together, and thereby removing impurities from the mixed solution.

2 Claims, 1 Drawing Figure

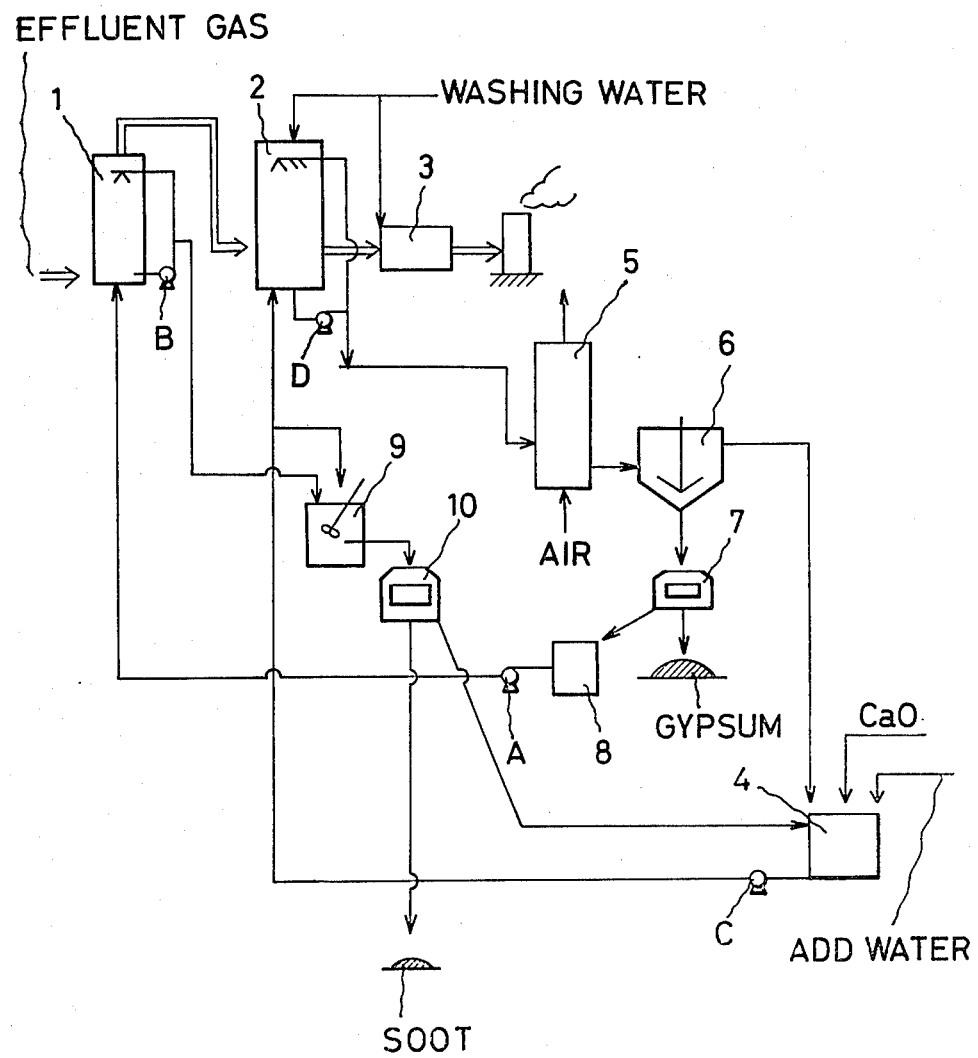

METHOD FOR IMPURITY REMOVAL IN A WET LIME-GYPSUM PROCESS EXHAUST DESULFURIZATION EQUIPMENT

This invention relates to a method of eliminating soot and metallic impurities from a lime slurry solution as well as gas in arrangements for removing sulfur oxide from a sulfur oxide-containing gas using the lime slurry solution as absorbent.

For the recovery of gypsum as a by-product from exhaust desulfurization equipment, a process as simplified and streamlined as possible is desired in view of the added value of the gypsum. On the other hand, the reclaimed gypsum is required to be of a high grade. These are the reasons why a system is needed whereby the foreign matter deposited in the course of the process can be removed in the simplest way possible and in a most advantageous manner for the utilization of wastes. Heretofore, it has been necessary for the recovery of salable gypsum through complete separation and removal of impurities, to abandon used water by one-way disposal or draining so as to avoid deposition of the impurities or, alternatively, to adopt a complicated separation and filtration system for the removal of the impurities from the liquid.

With the foregoing in view, the present invention aims at the provision of a method for removing impurities whereby the problem of one-way draining or of the necessity of complicated equipment can be solved and the utility and equipment costs can be largely saved through recycling of the filtrate and reduction of the impurity separation cost to a minimum.

The present invention will be better understood from the following description taken in conjunction with the accompanying drawing, in which:

The single FIGURE is a flow diagram of an arrangement adapted for practicing the method of the invention.

As shown, sulfur oxide-containing gas is led into a cooling tower 1, where it is humidified and cooled with a liquid while most of its dust content is collected from the gas. Next, the gas enters an absorption column 2, where, in contact with a lime slurry absorbent solution, it is freed from sulfur oxide. Then, via a demister 3 and a stack, the clean gas is released to the atmosphere. The solution being fed to the cooling tower 1 in accordance with this invention is the filtrate obtained after the separation of by-product gypsum. The filtrate from a filter-separator 7 where gypsum has been separated out as a by-product is collected in a storage tank 8 and is fed to the cooling tower 1 by means of a pump A. The filtrate, which contains metallic impurities in the form of dissolved sulfates of magnesium, aluminum, silicon, etc. inherited from the lime slurry from which gypsum has been recovered, is available in a very large quantity. It is therefore economically disadvantageous to separate the impurities directly from the filtrate. According to this invention, it is pumped to the cooling tower 1 and thence sprayed by another pump B as a humidifying and cooling medium in the tower. In this way the filtrate can be easily concentrated. The cooling tower liquid is partly drained off into a neutralizing tank 9, where the liquid is mixed and neutralized with a part of the slurry absorbent solution. The mixture is passed through a filter 10 simultaneously to separate and remove the above-mentioned metallic impurities as well as the dust collected from the gas in the cooling tower. During the filtration the carbon dust collected from the gas provide nuclei for the flocculation of the metallic hydroxides formed by the neutralizing reaction, thereby remarkably improving the filtration effect. The gas humidified, cooled, and freed from most of its dust content in the cooling tower 1 is then sent to the absorption column 2, where it is deprived of more than 90 percent of its sulfur oxide content by the lime slurry absorbent solution that is supplied from an adjusting tank 4 via a pump C and is sprayed by a pump D. Part of the absorbent solution is extracted out into an oxidizer 5 having specially designed air-dispersing means to form gypsum. The reaction formulas of the absorption and oxidation involved are as follows:

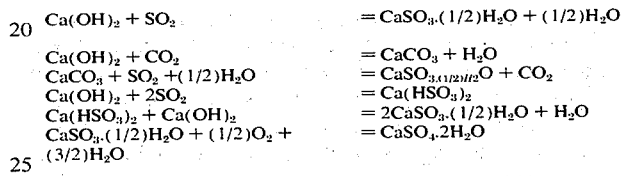

$Ca(OH)_2 + SO_2 = CaSO_3 \cdot (1/2)H_2O + (1/2)H_2O$
$Ca(OH)_2 + CO_2 = CaCO_3 + H_2O$
$CaCO_3 + SO_2 + (1/2)H_2O = CaSO_3 \cdot (1/2)H_2O + CO_2$
$Ca(OH)_2 + 2SO_2 = Ca(HSO_3)_2$
$Ca(HSO_3)_2 + Ca(OH)_2 = 2CaSO_3 \cdot (1/2)H_2O + H_2O$
$CaSO_3 \cdot (1/2)H_2O + (1/2)O_2 + (3/2)H_2O = CaSO_4 \cdot 2H_2O$ The absorbent solution converted to a gypsum slurry by the oxidizer 5 is conducted into a thickener 6, and the supernatant fluid thereby formed is led to the adjusting tank 4 to form a part of the slurry absorbent solution of material lime, while the remainder, or the most part of lime slurry, is extracted out into the gypsum filter-separator 7.

The filtrate that has left the filter-separator 7 is stored in the filtrate tank 8 to be subsequently fed to the cooling tower. Meanwhile, the liquid flocculated in the neutralizing tank 9 for separation of impurities is passed through the filter 10, where the solid impurities are eliminated, and the filtrate is sent to the adjusting tank 4. The filter 10 has to be of a very small capacity as compared with the gypsum filter-separator 7.

As will be obvious from the foregoing, the method of the invention has advantages that feed water can be recycled for the preparation and adjustment of the cooling tower solution and lime slurry absorbent solution and further as washing water for the absorbent column 2 and the demister 3. The deposited amounts of impurities in the absorption and oxidation reactions and in the separation of gypsum by filtration are not appreciably different from those in the conventional one-way draining of feed water. Moreover, the amount of the solution required for the separation of impurities is small, and the filtration-promoting effect of carbon dust makes possible a substantial increase in the impurity filtration capacity. These features and advantages combine with the simplicity of operation and low cost of initial investment to make the present invention highly contributory to the progress of industry.

EXAMPLE

Exhaust gas (2,000 Nm³/h) from a small oil-burning boiler was treated in accordance with the method of the invention, and the following results were obtained:

Composition of untreated gas:

| | SO₂ | H₂O | O₂ | Dust |
|---|---|---|---|---|
| | 0.08 vol% | 7.5 vol% | 6.3 vol% | 115 mg/Nm³ |

| | | | | | | |
|---|---|---|---|---|---|---|
| Inlet gas temperature | : | 220°C | | | | |
| Cooling tower outlet temp. | : | 55°C | | | | |
| SO₂ content of gas at outlet of absorption column | : | 53 ppm | | | | |
| Reaction rate of absorbent | : | 98.7 (mol%) | | | | |
| Results of solution analyses | : | (in mg/l) | | | | |

| | pH | Fe | V | Ni | Mg | Al | SiO₂ |
|---|---|---|---|---|---|---|---|
| Cooling tower solution | 1.50 | 120 | 7.0 | 5.0 | 18.3 | 6.2 | 15.0 |
| Filtrate after impurity separation | 12.6 | 4.1 | 1.0> | 0.53 | 0.55 | 3.0> | 9.5 |
| Separation efficiency (%) | | 96.5 | 85.7> | 89.5 | 97.2 | 51.5> | 36.6 |
| Specific filtration resistance of impurities | | $X = 2.0 \times 1.0^{10}$ m/kg | | | | | |

As described above, the present invention provides a method adapted for use with an exhaust desulfurization equipment for removing sulfur oxide from sulfur oxide-containing gas employing a lime slurry solution as absorbent. The method comprises the steps of supplying the solution from which by-product gypsum has been separated by filtration to a cooling tower as a medium for cooling and dedusting the gas yet to be desulfurized, collecting the dust from the gas in the cooling tower, partly extracting the solution from the tower and the lime slurry solution and mixing them together, and then removing dust and metallic impurities from the mixed solution. According to the method of the invention, the solution from which by-product gypsum has been separated is supplied to the cooling tower and is therein concentrated through contact with the gas being cooled. The concentrated solution is partly extracted and mixed and neutralized with a part of the slurry absorbent solution, and then is dedusted while being freed from the metallic impurities that originate from the lime. Further, in the neutralizing reaction of the mixture of the solution extracted from the cooling tower and the lime slurry solution, the dust from the extracted solution provides nuclei for the formation of flocs of metallic oxides, and therefore the filtration effect is all the more enhanced. Thus, according to this invention, pure gypsum can be obtained by gas desulfurization in a simplified and inexpensive way.

What is claimed is:

1. In a method for producing gypsum by the wet lime gypsum process wherein a sulfur dioxide containing desulfurization exhaust gas is cooled and dedusted, passed in contact with a lime slurry absorbent solution containing metallic impurities originating from the lime to absorb the sulfur dioxide therefrom, and the absorbent solution is then oxidized to produce a gypsum slurry from which the gypsum is separated by filtration, the improvement which comprises:
   a. using the filtrate from the separation of the gypsum as a cooling and dedusting medium for the gas by passing the filtrate in contact with said gas;
   b. mixing a part of the solution from step (a) with the lime slurry to precipitate the metallic impurities retained in the solution and thereby purify it; and
   c. using the purified solution to prepare the lime slurry.

2. The method of claim 1 wherein supernatant liquid is removed from the gypsum slurry prior to the filtration and the supernatant is also used to prepare the lime slurry.

* * * * *

UNITED STATES PATENT OFFICE
CERTIFICATE OF CORRECTION

Patent No. 3,903,243                Dated September 2, 1975

Inventor(s) MASUMI ATSUKAWA and H. USHIO, M. YANAGI

It is certified that error appears in the above-identified patent and that said Letters Patent are hereby corrected as shown below:

In the heading of the patent, insert

--[30] Foreign Application Priority Data

Nov.30,1971    Japan....................96585/1971

Signed and Sealed this sixteenth Day of December 1975

[SEAL]

Attest:

RUTH C. MASON                C. MARSHALL DANN
*Attesting Officer*                *Commissioner of Patents and Trademarks*